(12) United States Patent
Savoy

(10) Patent No.: US 6,711,800 B2
(45) Date of Patent: Mar. 30, 2004

(54) METHOD AND APPARATUS FOR ATTACHING A BODY PANEL TO AN AUTOMOTIVE VEHICLE FRAME

(75) Inventor: Mark A. Savoy, Metamora, MI (US)

(73) Assignee: Utica Enterprises, Inc., Shelby Township, MI (US)

( * ) Notice: Subject to any disclaimer, the term of this patent is extended or adjusted under 35 U.S.C. 154(b) by 0 days.

(21) Appl. No.: 10/147,175

(22) Filed: May 16, 2002

(65) Prior Publication Data

US 2002/0170158 A1 Nov. 21, 2002

Related U.S. Application Data

(60) Provisional application No. 60/291,522, filed on May 16, 2001.

(51) Int. Cl.[7] ............................................. B23P 11/00
(52) U.S. Cl. .......................... 29/434; 29/464; 29/468; 29/33 K; 29/281.5; 33/600
(58) Field of Search ..................... 29/404, 434, 464, 29/466, 468, 33 K, 33 P, 281.1, 281.5, 281.4; 33/600

(56) References Cited

U.S. PATENT DOCUMENTS

| | | | |
|---|---|---|---|
| 3,059,328 A | * 10/1962 | Krause | ...................... 29/404 |
| 3,968,559 A | 7/1976 | Karlsson | |
| 4,186,476 A | 2/1980 | Mair et al. | |
| 4,375,716 A | 3/1983 | Armstrong et al. | |
| 4,589,184 A | 5/1986 | Asano et al. | |
| 4,589,199 A | 5/1986 | Ohtaki et al. | |
| 4,617,712 A | * 10/1986 | Streett | ...................... 29/402.08 |
| 4,619,031 A | * 10/1986 | Loewe et al. | .................. 29/434 |
| 4,627,158 A | 12/1986 | Mitoh | |
| 4,736,515 A | 4/1988 | Catena | |
| 4,757,608 A | 7/1988 | Ochi | |
| 4,768,277 A | 9/1988 | Vogt et al. | |
| 4,860,424 A | * 8/1989 | Kaibuki et al. | ................ 29/434 |
| 4,907,331 A | 3/1990 | Kaibuki et al. | |
| 4,912,826 A | * 4/1990 | Dixon et al. | ................ 29/281.1 |
| 4,961,257 A | 10/1990 | Sakamoto et al. | |
| 5,011,068 A | 4/1991 | Stoutenburg et al. | |
| 5,040,290 A | * 8/1991 | Usui et al. | ...................... 29/787 |
| 5,203,811 A | 4/1993 | Hirotani et al. | |
| 5,644,817 A | 7/1997 | Bender et al. | |
| 5,787,550 A | 8/1998 | Bender | |
| 5,966,801 A | 10/1999 | Wu et al. | |
| 6,006,635 A | * 12/1999 | Stojkovic et al. | .............. 81/484 |
| 6,073,330 A | * 6/2000 | Roy | .......................... 29/281.5 |
| 6,086,143 A | 7/2000 | Schroeder et al. | |
| 6,098,265 A | * 8/2000 | Stojkovic et al. | .............. 29/464 |
| 6,101,706 A | 8/2000 | Roy | |
| 6,122,809 A | 9/2000 | Roy | |
| 6,122,813 A | 9/2000 | Roy et al. | |
| 6,122,819 A | * 9/2000 | Roy et al. | ....................... 29/714 |
| 6,149,222 A | * 11/2000 | Schambre et al. | ...... 296/146.12 |
| 6,311,382 B1 | 11/2001 | Jack | |

(List continued on next page.)

FOREIGN PATENT DOCUMENTS

JP           362286877 A    * 12/1987    .................. 29/428

Primary Examiner—Gregory Vidovich
Assistant Examiner—Essama Omgba
(74) Attorney, Agent, or Firm—VanOphem & VanOphem, P.C.

(57) ABSTRACT

An improved method and apparatus for attaching vehicle doors to a body such that the doors are attachable without further adjustment. A net body coordinate system is established for a welded vehicle frame, and upper and lower locating slots are pierced in hinge pillars of the vehicle frame relative to the net body coordinate system. An offline fixture is provided for setting upper and lower door hinges cross-car and forming a locating nubbin in the hinges relative to a door. The door is attached to the vehicle frame by engaging the locating nubbins in the door hinges with the locating slots in the vehicle hinge pillar.

20 Claims, 7 Drawing Sheets

U.S. PATENT DOCUMENTS

| | | |
|---|---|---|
| 6,317,925 B1 | 11/2001 | Pietryga et al. |
| 6,324,948 B1 | 12/2001 | Kavc et al. |
| 6,334,264 B1 * | 1/2002 | Oh .............................. 33/613 |
| 6,430,835 B1 * | 8/2002 | Ranucci et al. ............... 33/645 |
| 6,468,007 B2 * | 10/2002 | Coleiro ................... 408/115 R |
| 6,511,120 B1 * | 1/2003 | Mitts .......................... 296/202 |
| 2002/0023334 A1 * | 2/2002 | Rhoads et al. ................. 29/434 |

* cited by examiner

METHOD AND APPARATUS FOR ATTACHING A BODY PANEL TO AN AUTOMOTIVE VEHICLE FRAME

CROSS-REFERENCES TO RELATED APPLICATIONS

This application claims the benefit of U.S. provisional application Ser. No. 60/291,522 filed May 16, 2001.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to a method and apparatus for attaching a vehicle door to a vehicle frame or body-in-white. More specifically, this invention teaches a method and apparatus for attaching an automotive vehicle door whereby the door is attached at a net or best fit position such that the door is correctly centered and aligned with respect to the door opening in the vehicle frame, and associated feature lines align with adjacent panels upon attachment thereto without the need for a slip plane adjustment of the door on the vehicle frame.

2. Description of the Related Art

Conventionally, assembly of motor vehicle doors to a door opening has involved implementation of slip planes to facilitate assembly of the door to the vehicle. The door typically includes an outer panel joined to an inner panel by hem flanging the edge of the outer panel over the edge of the inner panel. The inner panel includes a front hinge mounting surface with upper and lower hinges mounted thereto and a rear latch mounting surface with a latch mounted thereto. The door opening is defined by a front hinge pillar, a rear latch pillar, a top roof rail and a bottom sill.

It is well known in the art to include slip planes in the door hinges or the hinge pillar. The slip planes permit fore/aft and up/down adjustment of the hinge as necessary to permit the door to be fitted within the body opening. The slip planes are typically slotted holes that are elongated in the direction of adjustment. For example, hinge pillar attachment holes in the hinge that are size specific up/down and elongated fore/aft locate the door in a fixed up/down position and permit adjustment of the door fore/aft relative to the fender and rear quarter panel.

Attachment bolts loosely attach the hinge to the hinge pillar such that the door is adjustable within the limits of the slotted attachment holes. While the door is loosely attached, an operator adjusts the hem edge of the door panel to a predetermined feature (typically the fender) using setting fixtures, a gap tool, and/or subjective trial and error inspection. After establishing a subjective proper position of the door, the operator tightens the attachment bolts thereby attaching the door hinges to the hinge pillar in the adjusted position.

The conventional method for adjusting the door within the door opening described above is both inefficient and subjective. The adjustment of the door typically requires an additional operator dedicated solely to aligning the door to the door opening, and the process of adjusting the door delays the assembly line. Additionally, conventional door alignment is subjective in that the process relies in part on the operator's judgment and inspection. Finally, the process of tightening the bolts attaching the door hinges to the hinge pillar applies torque to the hinges that can cause movement of the hinges and thereby create an improperly adjusted door.

U.S. Pat. No. 6,317,925 to Pietryga, et al. teaches an alternative to conventional elongated slot slip planes described above. More specifically, Pietryga, et al. teach a hinge trim system used to cover a hinge whereby portions of the hinge trim system form slip planes. The slip planes permit fore/aft and up/down adjustment of the hinge as necessary to permit the door to be fitted within the body opening. Cross-car adjustments can be accomplished by pivoting the hinge to the desired orientation.

The invention disclosed by Pietryga, et al. teaches a method for covering a non-styled exposed hinge, and further teaches a method for adjusting a door within a body opening based on an improved slip plane configuration. However, Pietryga, et al. still suffers from all of the problems associated with slip plane adjustment based on elongated slots discussed above.

U.S. Pat. No. 4,375,716 to Armstrong, et al. teaches a method by which a vehicle door may be precisely hinged to the vehicle body with the adjacent appearance features of the closure and the body precisely aligned and spaced relative to one another.

Armstrong, et al. provides a fixture that establishes positioning of hinge attachment holes in a body side panel relative to the door openings. The fixture includes locating pads that engage predetermined locations on the door openings to position the body side panel in up/down and fore/aft directions. Locating pins in the fixture represent optimal up/down and fore/aft position for the hinge attachment holes relative to the locating pads. Anchor plates having hinge attachment holes therein are loaded onto locating pins in the fixture and welded to the body side panel. In the manner described, Armstrong et al. position the hinge attachment holes in the anchor plates up/down and fore/aft relative to the door openings. After the location of the hinge attachment holes are set, the body side panel is toy tabbed and welded to the other components forming the frame in a framing fixture.

The cross-car position of the hinges are set in an offline door fixture relative to appearance features of the door. The up/down and fore/aft position of a frame attachment hole in the hinge is established in an offline piercing fixture. A door with hinges attached thereto is placed into the piercing fixture. Locating blocks in the piercing fixture engage a surface of the door outer panel and the leading edge of the door to establish fore/aft position. An additional locating block sets the door up/down position relative to top and bottom edges of the door. Clamping and locating fixtures hold the door hinge at a position simulating the closed position of the door. A piercing tool punches a size specific hole in the door hinge in a position relative to the door surfaces located by the fixture locating blocks.

The door is simultaneously attached and adjusted to the door opening by inserting a bolt through the size specific hole in the door hinge and the size specific hole in the anchor plate. As the position of the size specific hole in the anchor plate is adjusted up/down and fore/aft relative to the door opening, a door attached to the adjusted size specific hole in the anchor plate is automatically located up/down and fore/aft with respect to the door opening. Additionally, because the position of the size specific hole in the door hinge is adjusted up/down and fore/aft relative to the edges of the door, the door is automatically adjusted relative to adjacent body panels. Armstrong et al. teaches a method for attaching and adjusting a door within a door opening that does not rely on a slip plane or subjective operator inspection.

While Armstrong, et al. provides significant advantages over conventional slip plane based methods of attachment, it failed to account for the variation introduced when the frame is welded in the framing fixture and the variation introduced when the bolt attaching the door hinge to the anchor plate is tightened. Although the anchor plate is initially located relative to the door openings, the heat generated by the numerous welding operations (as many as 3,000) in the framing fixture deforms the body side panel in an unpredictable manner such that the hinge attachment holes in the anchor plate do not necessarily remain in the same relative position. Additionally, the process of tightening the bolts attaching the door hinges to the hinge pillar applies torque to the fastening bolts. As the fastening bolts frictionally engage the hinge plates, the torque applied to the fastening bolts can cause rotation of the hinge plates and thereby take a properly adjusted door out of alignment. Also, the specific door as built by Armstrong et al. must be installed in a specific body side opening. The coordination of the doors with corresponding vehicle bodies is an absolute necessity and an improperly coordinated door that will not align properly with the body side opening leads to excessive offline repair costs after the body is completed.

From the above, it can be appreciated that the related art methods discussed are not optimized to accurately and efficiently assemble any door in any door opening that has unknown tolerance deviations resulting from its own manufacturing processing. Therefore, what is needed is a method and apparatus for assembling a door, which does not rely on subjective slip plane adjustment in the vehicle frame, can be installed on any vehicle frame opening, does not rely on frame locations established before the frame is welded, and that can maintain proper alignment while the hinge attachment bolts are tightened.

BRIEF SUMMARY OF THE INVENTION

According to the preferred embodiment of the present invention, there is provided an improved method and apparatus for attaching vehicle doors to a vehicle body often referred to as a body-in-white, such that the doors are attachable at a net location. Furthermore, the apparatus includes a feature for maintaining and ensuring proper door positioning while the hinge attachment bolts are tightened to net locate the door in its best fit assembly position.

The method described herein includes the steps of utilizing a new net X-Y-Z coordinate system for a vehicle frame after the frame is welded in a framing fixture, and piercing or forming upper and lower net positioned locating slots in hinge pillars of the vehicle frame relative to the new net X-Y-Z coordinate system. The method further includes the steps of forming a locating nubbin in upper and lower hinges relative to the door, and aligning the locating nubbins with the locating slots during attachment of the door to the vehicle frame. In the context of the following summary of the invention, reference to the fore/aft (X), cross-car (Y), and up/down (Z) axes, as well as the relative terms front, rear, top and bottom, apply to a component as viewed in final body position unless otherwise specified.

The new net X-Y-Z coordinate system is advantageously established after the frame is welded in the framing fixture so that variation introduced during the welding and assembly process can be balanced out and therefore disregarded. A position detecting apparatus on an assembly line is adjustable up/down, fore/aft and cross-car relative to the vehicle frame. Locating pins of the position detecting apparatus engage net locating holes or features of the vehicle frame to establish the new net X-Y-Z coordinate system for each individual vehicle frame in its as built condition. The position detecting apparatus adjusts to locate relative to selected body-in-white locating features and after locating, plug into associated sockets and lock in place to establish a new net X-Y-Z coordinate system and remain in the locked position for the duration of the assembly process on a particular vehicle. Work performing devices attached to the position detecting apparatus are then located net with respect to the new net X-Y-Z coordinate system established for the specific vehicle frame to perform work on the vehicle frame.

The work performing devices punch the net locating slots in the hinge pillar relative to the new net X-Y-Z coordinate system. As the locating slots are formed relative to the new net X-Y-Z coordinate system, their position is also net such that the locating slots are at a new net position relative to the newly established coordinate X-Y and Z for a specific vehicle frame. The upper locating slot is size specific in both the fore/aft and up/down directions whereby engagement with the corresponding nubbin on the upper hinge locates the door both fore/aft and up/down. The lower locating slot is size specific in only the fore/aft direction and oversized in the up/down direction whereby the corresponding nubbin on the lower hinge locates in the lower slot only in the fore/aft direction to avoid an interference condition when both nubbins are mounted in the slots.

According to the preferred embodiment, the locating nubbins in the upper and lower hinges are positioned relative to the door assembly in an offline door fixture. The offline door fixture locates the door on a Class A surface on the door outer panel and on the peripheral hemmed edge. The offline door fixture further includes a master plate simulating the net hinge pillar in the vehicle frame, and upper and lower punches for making the upper and lower locating nubbins on the hinges.

The hinges include a first hinge link pivotally connected to a second hinge link. The first hinge link has oversize door attachment holes through which the hinges are loosely attached to the inner door assembly. The door attachment holes are slotted such that the loosely attached hinges can be set to a net cross-car position as discussed hereinafter. Additional oversized holes are provided in the second hinge link for later attachment to the body.

In the preferred embodiment, the door assembly with the hinges loosely attached thereto is loaded into the offline door fixture such that the bottom of the door rests on an up/down net pad, a Class A surface on the door outer panel locates on a cross-car net pad, and the leading edge of the outer door panel is located by the fore/aft locating block so as to net locate the door in the up/down and fore/aft directions. It is contemplated that any convenient method may be used to net locate the door in the door fixture. For example, it is possible to locate the door in the door fixture up/down and fore/aft by net locating on the Class A contour surface of the outer panel or use a feature line on the outer panel to net locate the door in the up/down direction. Alternatively, a window opening feature such as a belt line can also be used.

The hinges are set net cross-car to the master plate positioned to simulate the hinge pillar of the vehicle frame. While still loosely attached to the door assembly, the hinges are moved cross-car into contact with the master plate and tightened to the door assembly thereby setting the net cross-car position of the door relative to the net hinge pillar position. The up/down locators in the offline door fixture locate a door feature at the front of the door and rear of the door to establish up/down position of a feature line on the outer door panel relative to the bottom of the door. The door is secured in the fixture and the upper and lower punches operate to form the locating nubbins in the hinges relative to the up/down and fore/aft position established by the locating technique described above in the offline fixture.

After the door is processed through the offline fixture, the door is attached to any vehicle frame by mounting the second hinge link of the upper and lower hinges to the hinge pillar on the vehicle frame such that the locating nubbins are inserted into the locating slots. As all door assembly attachment/locating points are in a net position, and the locating slot is positioned relative to the newly established net position for the particular vehicle, the door is automatically set up/down and fore/aft to the body at a best fit position, that is, gapping between the door and the opening is constant all the way around the door since the gap has been averaged out by being able to locate net to the opening. Also, the door will be flush to the adjacent panels and if a feature line has been identified as critical, this line will line-up with similar feature lines in adjacent panels. Additionally, because the cross-car position of the door has already been set net relative to the master plate simulating the hinge pillar in the offline fixture, the net cross-car position of the door is automatically obtained upon attachment. Finally, any frictional movement due to the torque applied to the second hinge link during attachment of the door to the frame cannot cause rotation of the hinge link because of the engagement of the locating nubbins within the locating slots.

It is an object of the present invention to provide a method and apparatus for establishing a net position for attaching a door to a vehicle body thereby eliminating slip plane adjustment of the door in the vehicle frame and associated subjective flush and fit adjustments.

It is another object to provide a method and apparatus for attaching a door to a vehicle body such that the door is net positioned to the body upon attachment.

It is still another object to provide a method and apparatus for attaching a door to a vehicle frame such that the process of tightening the attachment screws does not alter alignment of the door with respect to the door opening.

It is yet another object to provide a method and apparatus for adjusting a door on a vehicle body that does not rely on subjective operator adjustment.

It is a further object to provide a method and apparatus for attaching any door to any vehicle frame opening such that it is not necessary to coordinate specific doors with specific vehicle frames.

It is still a further object to provide a method and apparatus for utilizing a net body coordinate system on a vehicle body after the body-in-white has been welded such that all outer body panels such as doors, hoods, fenders, decklids, liftgates, bumpers, and/or fascias can be attached with established net features without the need for subjective flush and fitness adjustments.

These objects and other features, aspects, and advantages of this invention will be more apparent after a reading of the following detailed description, appended claims, and accompanying drawings.

DETAILED DESCRIPTION OF THE INVENTION

Generally shown in the Figures, a method and apparatus for attaching a door to a vehicle frame is shown in accordance with the present invention. In the context of the following detailed description of the preferred embodiment which is an automobile, references to the fore/aft (X), cross-car (Y), and up/down (Z) axes, as well as the relative terms front, rear, top and bottom, apply to a vehicle component as viewed in the final assembled position unless otherwise specified. Also, reference to a "Class A" surface means any surface on the completely assembled vehicle that is visible to an observer.

Figure 1:
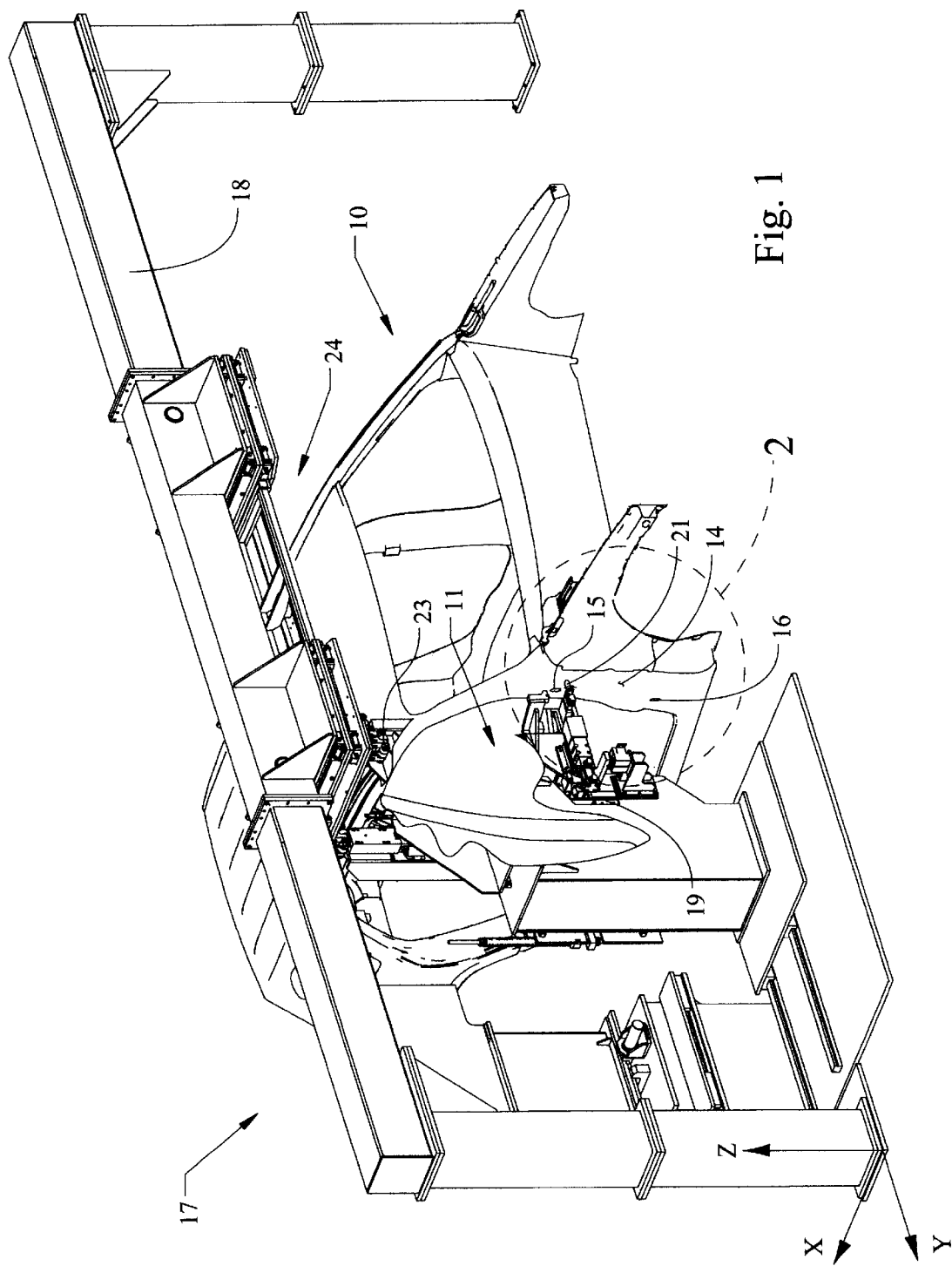
FIG. 1 is an isometric view of a vehicle frame with a corresponding master station.

Referring now in detail to the Figures, FIG. 1 shows a vehicle frame or body-in-white 10 having a door opening 11, a plurality of primary locating points (not shown), and a hinge pillar 14. The vehicle frame 10 further includes an upper locating slot 15 and a lower locating slot 16 that have been established after complete processing of the body-in-white as described in the co-pending patent application Ser. No. 10/146,780. filed May 16, 2002, entitled "Method and Apparatus for Assembling Exterior Automotive Vehicle Body Components onto an Automotive Vehicle Body" owned by the common assignee hereof and incorporated herein by reference in its entirety. Although the hinge pillar 14 is shown in the preferred embodiment as having attachment surfaces in the X-Z plane, it should be understood that the invention applies equally to a hinge pillar or any attachment surface that provides location features for the hinges in the Y-Z or X-Y plane. Additionally, the preferred embodiment described hereinafter will include driver side and passenger side hinge pillars each with an upper locating slot 15 and a lower locating slot 16 configured to accommodate upper and lower door hinges, however, vehicles with additional doors and/or hinged panels, i.e., hoods, liftgates, decklids, and hinged windows for minivans can be envisioned according to this invention.

Figure 2:
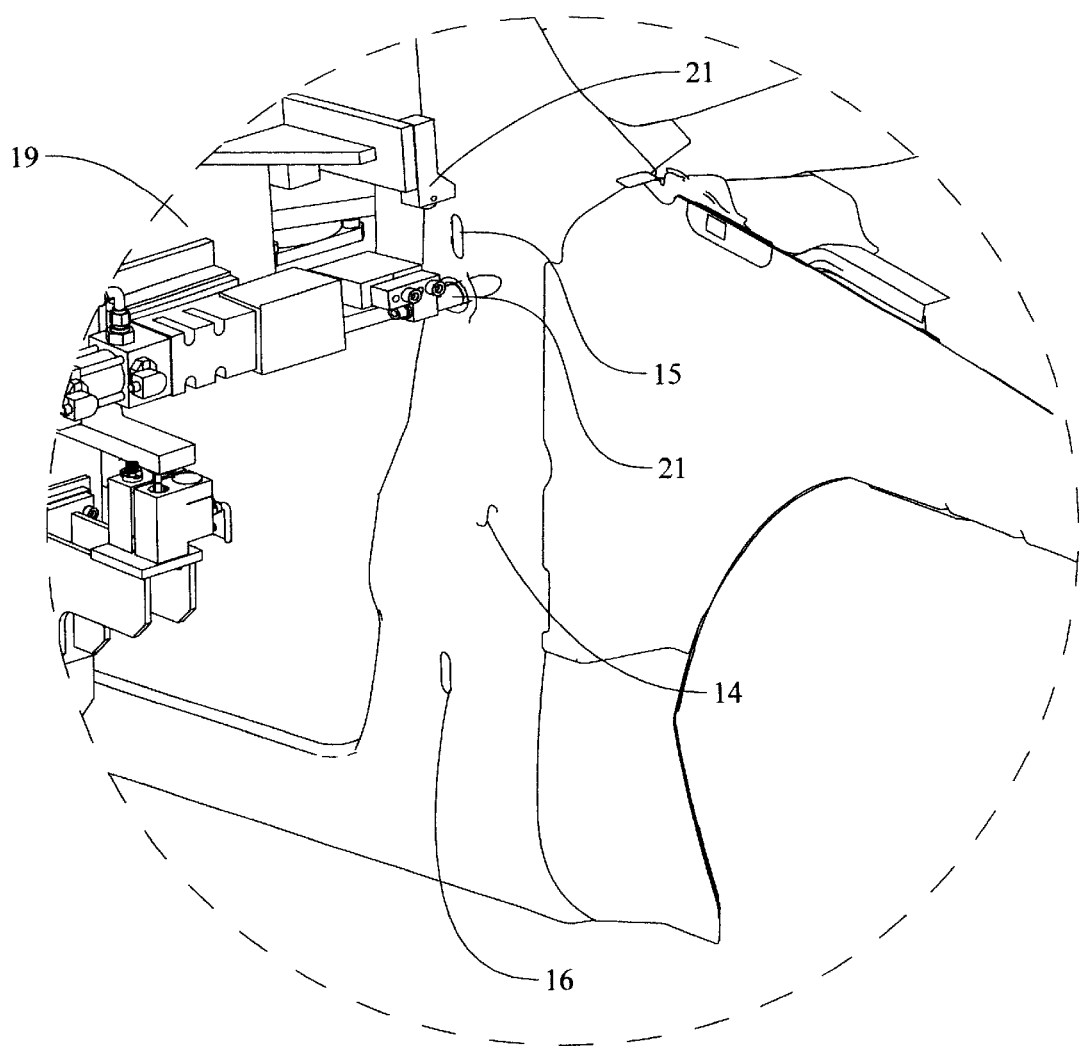
FIG. 2 is a view of a position detecting apparatus locating the vehicle frame of FIG. 1 as shown in circle 2 of FIG. 1.

Referring to FIGS. 1 and 2, there is shown a master locating station 17 having a gantry frame 18 with position detecting apparatuses (PDA) 19 and work performing devices (not shown). The PDAs 19 include probes 21 for locating up/down, fore/aft and cross-car features of the body-in-white 10. The probes 21 in the PDAs 19 engage the selected primary locating points to establish a new net X-Y-Z coordinate system for each vehicle frame 10 as built. The PDAs 19 find and locate the selected primary locating points on the body-in-white and lock into place for the duration of the assembly process on a particular vehicle. Located on each PDA 19 is a sliding locating pin (not shown) which, after the PDAs 19 are locked in place, is moved into an overhead socket 23 suspended from the gantry frame 18. The socket 23 is part of a bellcrank system 24 that is fixed to the overhead gantry frame 18 of the master station. The bellcrank system 24 is a lever and crank mechanism that will contact an object at two opposite ends thereof and generate the exact center of the object. Accordingly, when the PDAs 19 surrounding the vehicle as built are locked in place and the associated sliding locating pin for each unit is moved into a respective socket 23, the exact center of the vehicle is found and the result is a new net X-Y-Z grid for the vehicle as built. This new net X-Y-Z grid takes into account the tolerance variation of the building processes and reestablishes new net X-Y and Z coordinates for the body-in-white 10 as built.

The work performing devices that locate, utilizing the floating techniques of the PDAs 19, are then located net with respect to the newly established net X-Y-Z coordinate for the specific vehicle frame 10. The new net X-Y-Z coordinate system is advantageously established after the vehicle frame 10 is welded in a framing fixture (not shown) so that variation introduced during the welding and assembly process can be balanced out on either side of the X-Y and Z planes.

The work performing devices located net with respect to the net X-Y-Z coordinate system form the upper and lower locating slots 15 and 16 in the hinge pillar 14 relative to the newly established net X-Y-Z coordinate system. As the upper and lower locating slots 15 and 16 are formed relative to the net X-Y-Z coordinate system, the position thereof is also net such that the upper and lower locating slots 15 and 16 are at a net position with respect to a specific vehicle frame. The upper locating slot 15 is size specific in the fore/aft and up/down directions whereas the lower locating slot 16 is size specific only in the fore/aft direction and over-sized in the up/down direction to avoid binding of the nubbins when they are placed in the slots upon assembly of the door to the door opening 11.

Figure 3:
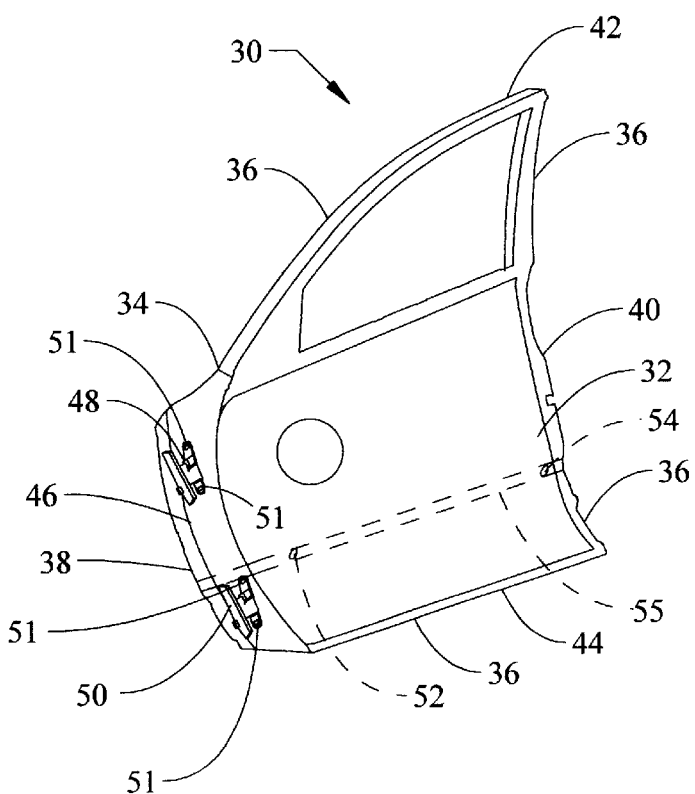
FIG. 3 is an isometric view of a door assembly.

Referring now to FIG. 3, a door assembly 30 in accordance with the present invention is shown. The door assembly 30 generally includes a door inner panel 32, a door outer panel 34 opposite the door inner panel 32, and a peripheral hemmed edge 36. The peripheral hemmed edge 36 includes a leading hemmed edge 38, a trailing edge 40 opposite the leading hemmed edge 38, a header 42 and a bottom hemmed edge 44 opposite the header 42. All of the edges are created by hemming the outer panel over the inner panel to establish a locked connection. Appropriate areas may be welded, as necessary. The door inner panel 32 includes a hinge mounting surface 46 having upper 48 and lower 50 hinges loosely attached thereto with a plurality of attachment bolts 51.

The preferred embodiment of the door outer panel 34 is shown having a plurality of appearance features of which a first appearance feature 52 and a second appearance feature 54 are assigned priority. The first and second appearance features 52 and 54 establish what is commonly referred to as a feature line 55. Priority is generally assigned to an appearance feature that is readily observable by the consumer such that up/down, fore/aft or cross-car alignment thereof is important, however, it should be apparent that other door features can be used to establish priority status position. In the preferred embodiment, the first and second appearance features 52 and 54 are trim attachment holes. As the trim extends from the vehicle's front fender (not shown), along the door outer panel 34 and to the rear quarter panel (not shown), it can be seen that up/down misalignment would be readily apparent. Therefore, this feature is selected as having top priority in terms of alignment on the door.

Figure 4:
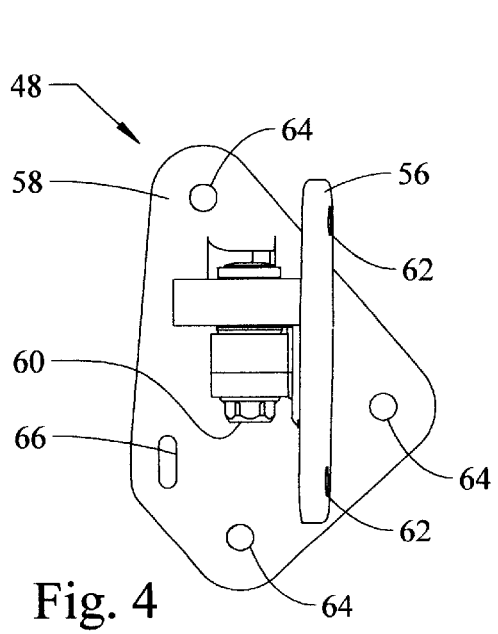
FIG. 4 is a fore/aft view of a hinge of the door assembly of FIG. 2.
Figure 5:
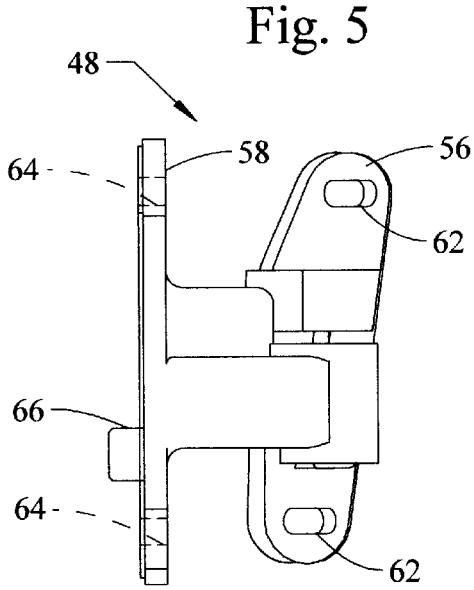
FIG. 5 is a cross-car view of a hinge of the door assembly of FIG. 2.

As best seen in FIGS. 4 and 5, the upper hinge 48 includes a first hinge link 56, a second hinge link 58, and a hinge pin 60. The first hinge link 56 includes door attachment holes 62 that are preferably elongated slots such that after being loosely attached to the door, the hinge is adjustable on the door in the cross-car or Y plane and restrained along the up/down or Z plane. The second hinge link 58 includes three hinge pillar attachment holes 64 that are preferably oversized and may be arranged in any convenient location. The second hinge link 58 also has an upper locating nubbin 66 net positioned up/down and fore/aft relative to the door assembly 30. The lower hinge 50 includes the same components as the upper hinge 48 except that the lower hinge 50 has a lower locating nubbin (not shown) equivalent to the upper locating nubbin 66. The lower locating nubbin 68 is like the upper locating nubbin 66 with the exception of the relative position thereof.

Figure 6:
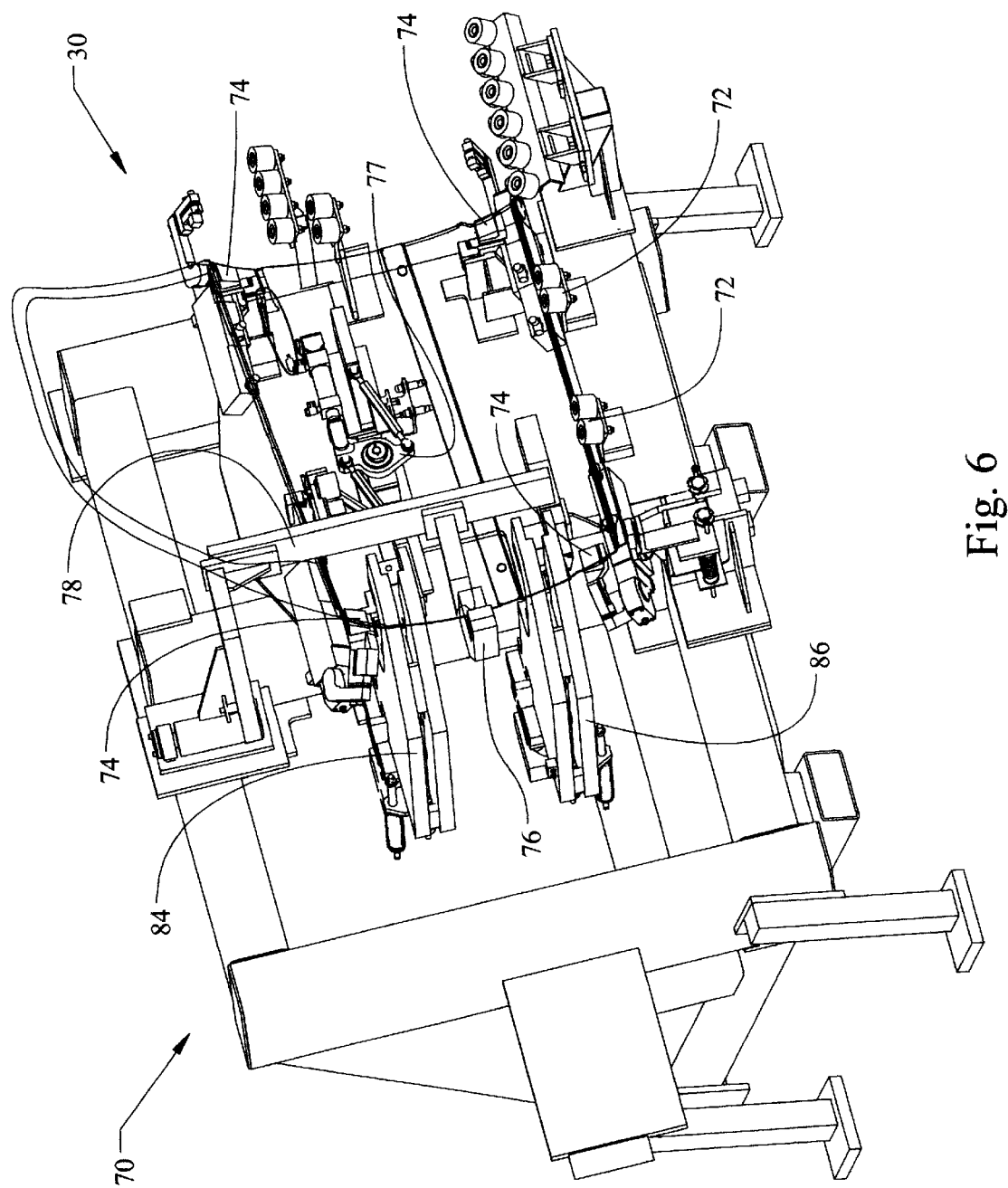
FIG. 6 is an isometric view of the door assembly of FIG. 3 loaded into an offline door fixture.

FIG. 6 shows the door assembly 30 loaded into an offline door fixture 70. According to the preferred embodiment, a master plate 78 in the offline door fixture 70 simulating the design intent or net body hinge pillar position 14 sets the loosely attached upper and lower hinges 48 and 50 to a net position in the Y axis. The net X axis position for the nubbin 66, is set based on an average of the leading hemmed edge 38 and trailing edge 40 fore/aft positions as established by a fore/aft bellcrank 77. Front and rear up/down locators 80 and 82 (shown in FIG. 9) establish the net Z axis position for the nubbin 66, and the upper and lower nubbins 66, (not shown) are stamped in the second hinge link 58 at the net X and Z position by an upper and lower punches 84 and 86 respectively. It should be appreciated that the precise locating points, and the sequence in which the X, Y, and Z axes are sets, will vary on each fabricated door and for each different body style. The following discussion pertains to one of many possible embodiments and therefore should not be considered limiting.

Figure 7:
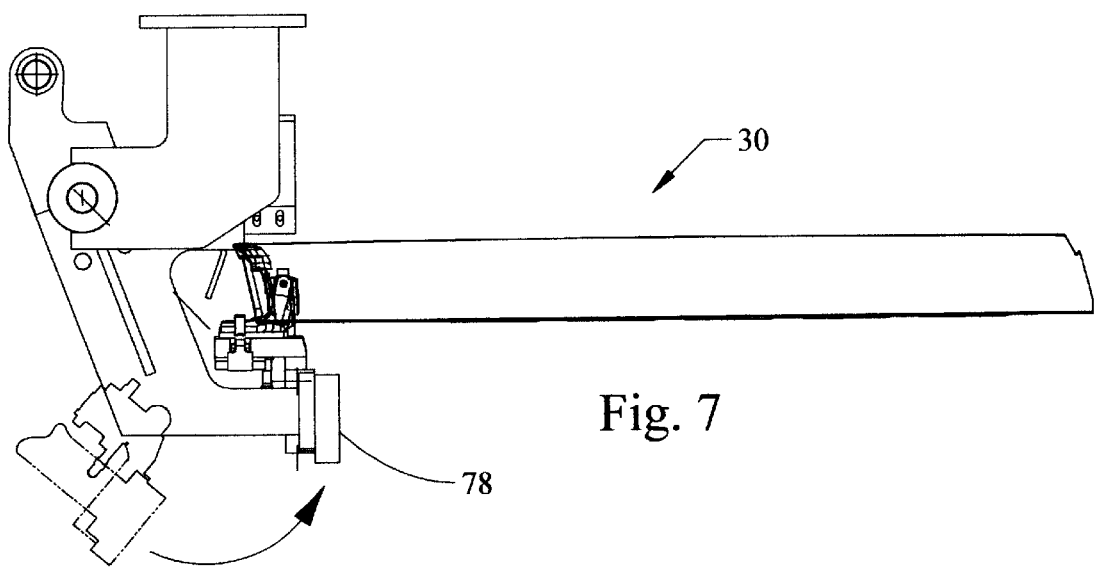
FIG. 7 is an up/down view of the master plate of the offline door fixture of FIG. 6 engaged with the door assembly of FIG. 3.
Figure 8:
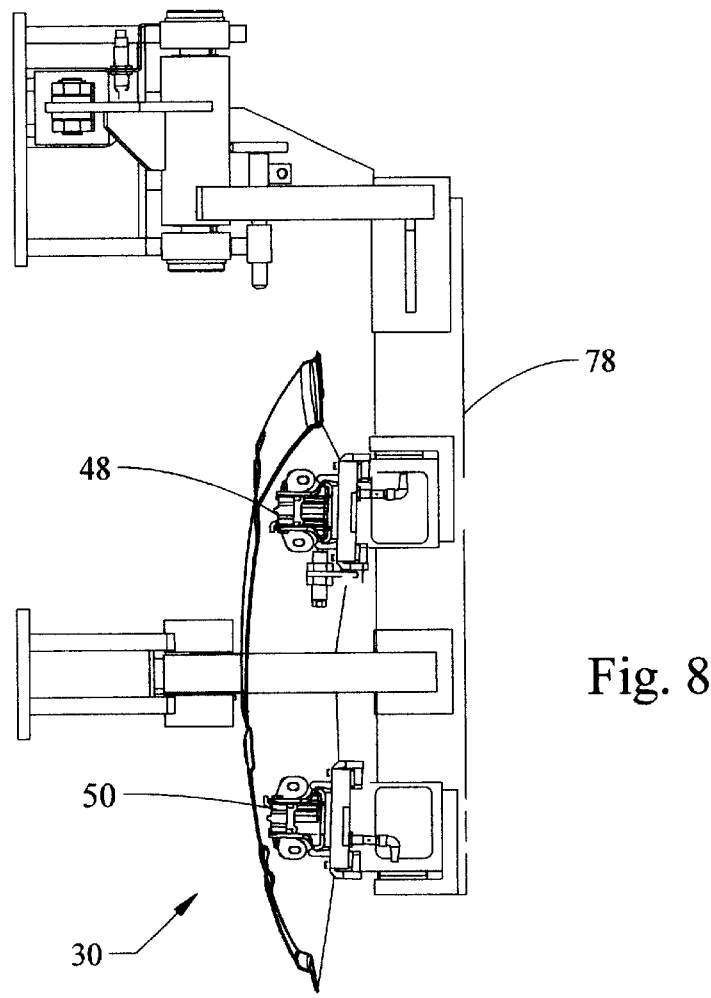
FIG. 8 is a fore/aft view of the master plate of the offline door fixture of FIG. 6 engaged with the door assembly of FIG. 3.

According to the preferred embodiment, the door assembly 30 is positioned in the offline door fixture 70 such that the bottom hemmed edge 44 rests on up/down net pad or rollers 72, the outer surface of the door outer panel 34 locates on cross-car net pads 74, and the leading hemmed edge 38 is positioned against a fore/aft locating block 76. As best seen in FIGS. 7 and 8, when the door assembly 30 is properly located in the offline door fixture 70, the master plate is rotated into place. The loosely attached upper and lower hinges 48 and 50 are moved by sliding the complete hinge assembly along the elongated attachment holes 62 of the first hinge link 56 until the second hinge link 58 firmly comes into contact with the master plate 78 of the offline door fixture 70. Since the master plate 78 simulates the net position of the hinge pillar 14 on the vehicle body, the cross-car position of the door assembly 30 is now established net.

While the second hinge link 58 is engaged with the master plate 78, the attachment bolts 51 in the door attachment holes 62 of each first hinge link 56 of the upper and lower hinges 48 and 50 are tightened to the door inner panel 32 thereby setting the cross-car net position of the door assembly 30 relative to the door opening 11 in the vehicle frame 10. The door assembly 30 is clamped to the offline door fixture 70 directly above and below the upper and lower hinges 48 and 50 to prevent the door assembly 30 from moving while torque is applied to tighten the attachment bolts 51. As the cross-car position of the upper and lower hinges 48 and 50 are set net in the door assembly 30 relative to the net position of the net hinge pillar 14 of the vehicle body simulated by the master plate 78, the door assembly 30 configured in this manner will attach to an established net attachment point on any vehicle frame 10 such that the door outer panel 34 is aligned net in the cross-car plane upon attachment of the hinges 48 and 50 to the hinge pillar 14.

Referring again to FIG. 6, the offline door fixture 70 forms the nubbins 66, 68 in the net fore/aft or X plane based on an average of the leading 38 and trailing 40 hem edge fore/aft positions as established by the fore/aft bellcrank 77. The fore/aft bellcrank 77 is a lever and crank mechanism similar to the bellcrank system 24 previously described. According to the preferred method for establishing the net fore/aft position for the nubbins 66, the door outer panel 34 will be centered in the door opening 11 fore/aft with a constant gap around the door outer panel 34. Alternately, the net fore/aft position for the nubbins 66, can be established relative to the leading hem edge 38 of the door assembly 30 located by the fore/aft locating block 76. The leading hem edge 38 may be assigned priority in order to maintain a constant gap between the door outer panel 34 and the front fender (not shown). The fore/aft position of the lower nubbin (not shown) is further adjustable in the X direction to allow for kick up. Kick up refers to the well known method of attaching a door to a body such that the rear of the door is higher than the front of the door to compensate for door sag when the door hardware (not shown) is added.

Figure 9:
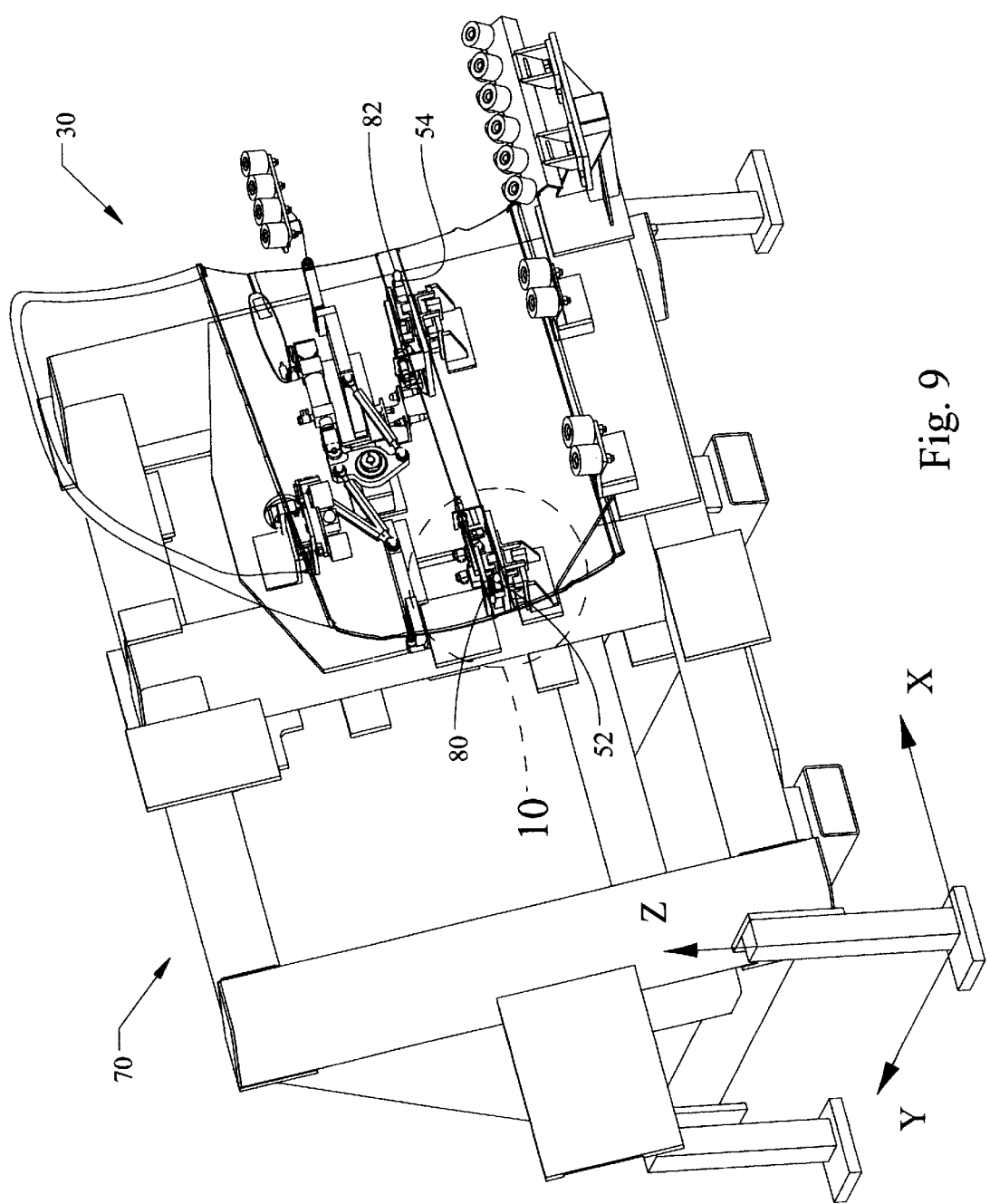
FIG. 9 is an isometric view of a door outer panel of the door assembly of FIG. 2 being located by the offline door fixture of FIG. 5.
Figure 10:
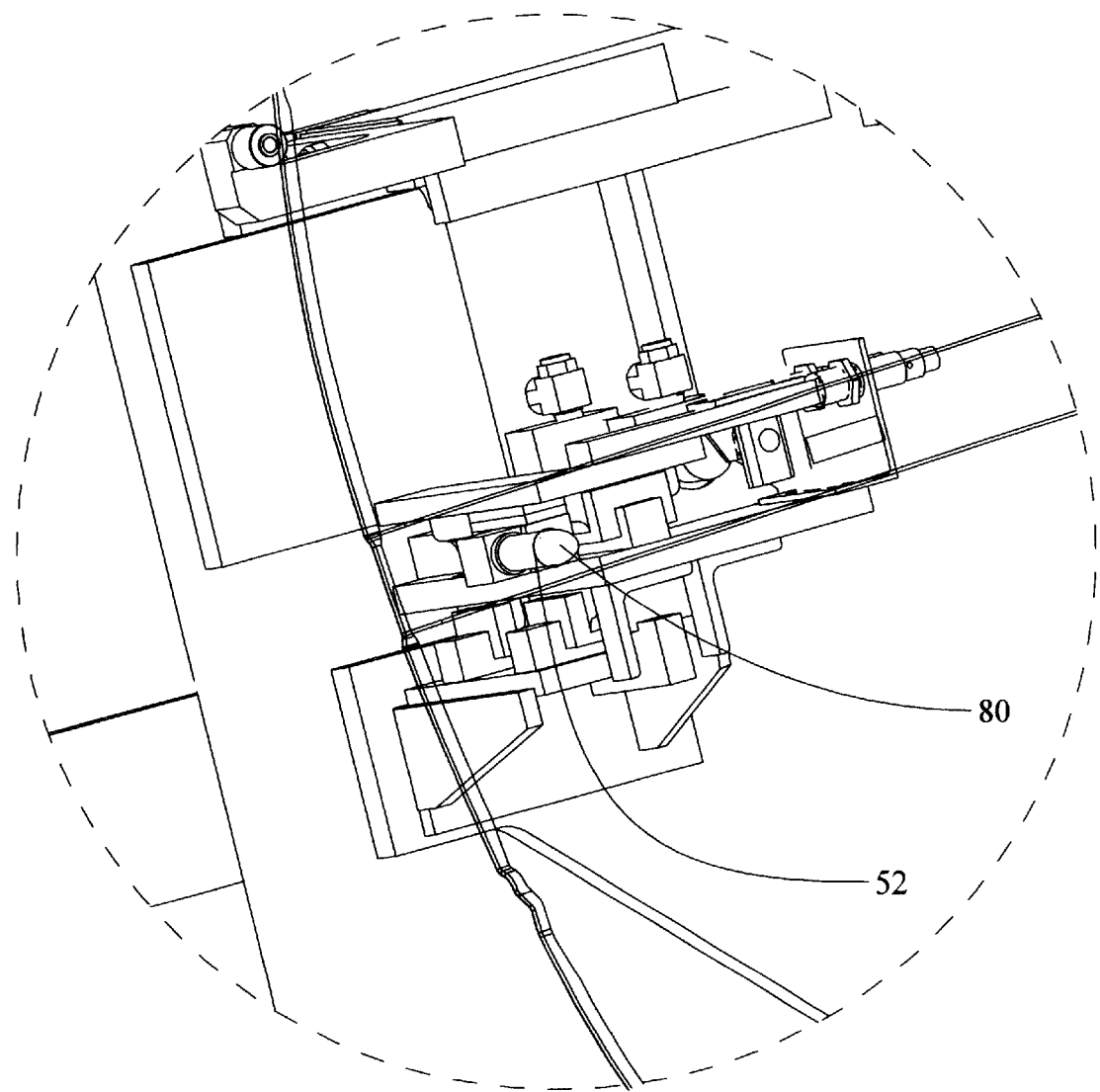
FIG. 10 is a view of an up/down locator engaging an appearance feature of the door assembly of FIG. 3 as shown in circle 10 of FIG. 9.

Having set the upper and lower hinges 48 and 50 net in the cross-car or Y position using the above process, and having established the net fore/aft or X position for the nubbins 66, it is now necessary to set the Z plane as depicted in FIGS. 9 and 10. Since the first 52 and second 54 appearance features or feature line 55 were initially selected to ensure that they line up with similar features on adjacent panels, the front 80 and rear 82 up/down locators are positioned in the offline door fixture 70 to find the location of these features in the door outer panel 34. Appropriate up/down or Z plane read out devices (not shown), well known in the art, are used to provide a dimensional read out of each of these features with respect to a chosen reference point.

Upon knowing exactly where the first 52 and second 54 appearance features are in the up/down or Z direction, a correction can be made within the offline door fixture 70 to ensure that both features are horizontally aligned, if so desired. The correction to ensure horizontal alignment can be in different forms. For example, the door assembly 30 may be tilted either at the front or rear with respect to the up/down net pad 72 upon which it rests. Alternatively, the tooling for striking the lower nubbin (not shown) in the second hinge link 58 may be adjusted fore/aft which results in a rotation of the door to ensure that the feature line 55 is horizontal and properly mates with a similar feature line on an adjacent panel, i.e. front fender (not shown) and/or rear quarter panel (not shown). Upon adjusting the door assembly 30 or tooling to provide net positioning of the feature line 55, the offline door fixture 70 proceeds to stamp the upper and lower nubbins 66, (not shown) in the respective upper and lower hinge 48 and 50.

All door attachment features are now set at a net position in X, Y and Z. When the second hinge link 58 of the upper hinge 48 is moved into position against the hinge pillar 14 on the body-in-white 10, the upper nubbin 66 will net locate the door in the X and Z plane by locating in the net upper locating slot 15 in the hinge pillar 14. The first hinge link 56 of the upper hinge 48 has already been set in net cross-car position so that upon driving the attachment bolts 51 into the hinge pillar attachment holes 64 of the second hinge link 58, the complete door assembly 30 will be attached in net position to the door opening 11 and the door feature line 55 will properly line up with the feature line on either the front fender (not shown) or the rear quarter panel (not shown). The lower locating slot 16 is size specific in the X direction and oversized in the Z direction such that the lower nubbin (not shown) locates net only in the X direction to avoid a conflict with the location of the upper nubbin 66.

Based upon the apparatus and method disclosed herein, other attachment panels having similar hinging features (hood, decklid, liftgate, sliding doors or hinged rear windows) can use the disclosed apparatus and/or method of attachment resulting in a net positioning of major panels for attachment to a body-in-white of an automotive vehicle.

While the present invention has been described in terms of a preferred embodiment, it is apparent that other forms could be adopted by one skilled in the art. For example, the present invention is applicable to the assembly of other types of vehicles such as airplanes, boats, trucks, buses, etc. In other words, the teachings of the present invention encompass any reasonable substitutions or equivalents of claim limitations. Those skilled in the art will appreciate that other applications, including those outside of the automotive industry, are possible with this invention. Accordingly, the scope of the present invention is to be limited only by the following claims.

What is claimed is:

1. An apparatus for configuring at least one hinge relative to a door assembly for mounting said door assembly in an opening of a vehicle frame, said apparatus comprising:
   a door assembly defined by X, Y and Z coordinate axes, said door assembly comprising at least one hinge, said at least one hinge comprising a first hinge link having means for attachment to said door assembly and a second hinge link pivotally attached to said first hinge link, said second hinge link having a locating nubbin and means for attachment to said vehicle frame;
   means for setting said at least one hinge in any one of said X, Y and Z coordinate axes relative to said door assembly whereby said door assembly is aligned in said one of said X, Y and Z coordinate axis with said vehicle frame upon attachment thereto; and
   means for positioning said locating nubbin in the remaining of said X, Y and Z coordinate axes relative to said door assembly, whereby said door assembly is aligned in said second and third of said X, Y and Z coordinate axes with said vehicle frame upon attachment thereto.

2. The apparatus according to claim 1, wherein:
   said door assembly has a first plurality of appearance features and a second plurality of appearance features, whereby said first and second plurality of appearance features are externally observable features; and
   said at least one hinge comprises an upper hinge and a lower hinge.

3. The apparatus according to claim 2, wherein said means for setting said upper and lower hinges in any one of said X, Y and Z coordinate axes relative to said door assembly comprises an offline door fixture having a first locator, and a master plate positioned to establish a net body position in said one of said X, Y and Z coordinate axes for said upper and lower hinges relative to said first locator.

4. The apparatus according to claim 3, wherein said first locator engages said door assembly in said one of said X, Y and Z coordinate axes, and said upper and lower hinges are adjusted in said one of said X, Y and Z coordinate axes to engage said master plate such that said upper and lower hinges are set in said net body position in said one of said X, Y and Z coordinate axes relative to said door assembly.

5. The apparatus according to claim 2, wherein said means for positioning said locating nubbin in the remaining of said X, Y and Z coordinate axes relative to said door assembly comprises an offline door fixture, whereby said locating nubbin is positioned in a second of said X, Y and Z coordinate axes relative to one or more of said first plurality of appearance features and said locating nubbin is positioned in a third of said X, Y and Z coordinate axes relative to one or more of said second plurality of appearance features.

6. An apparatus for attaching and aligning a door to a vehicle frame defined by X, Y and Z coordinate axes, said vehicle frame comprising:
   a vehicle frame having a hinge pillar, said hinge pillar further having at least one locating slot;
   means for establishing a net body coordinate system for said vehicle frame;
   means for establishing a net position of said at least one locating slot relative to said net body coordinate system such that said at least one locating slot is in a design intent position with respect to said net body coordinate system;
   a door assembly adapted to be attached to said vehicle frame, said door assembly comprising:
      an outer panel, an inner panel opposite said outer panel, and a peripheral edge; and
      at least one hinge attached to said door assembly, said at least one hinge comprising a first hinge link having means for attachment to said door assembly; and a second hinge link pivotally attached to said first hinge link, said second hinge link having a locating nubbin and means for attachment to said hinge pillar;
   means for setting said at least one hinge in any one of said X, Y and Z coordinate axes relative to said door assembly whereby said door assembly is aligned in said one of said X, Y and Z coordinate axes with said vehicle frame upon attachment thereto; and
   means for positioning said locating nubbin in a second and third of said X, Y and Z axes relative to said door assembly, whereby said door assembly is aligned in said second and third of said X, Y and Z axes with said vehicle frame upon attachment thereto.

7. The apparatus according to claim 6, wherein:
   said hinge pillar has an upper locating slot and a lower locating slot;
   said at least one hinge comprises an upper hinge and a lower hinge; and
   said outer panel has a first appearance feature and a second appearance feature, whereby said first and second appearance features are externally observable features of said door assembly.

8. The apparatus according to claim 7, wherein said any one of said X, Y and Z axes is the Y axis, and further wherein said means for setting said at least one hinge in any one of said X, Y and Z axes relative to said door assembly comprises an offline door fixture having a cross-car net pad, and a master plate positioned to simulate said hinge pillar.

9. The apparatus according to claim 8, wherein said cross-car net pad engages said outer panel, and said master plate engages said second hinge link of said upper and lower hinges such that said upper and lower hinges are set cross-car relative to said door outer panel and said master plate.

10. The apparatus according to claim 7, wherein said second and third of said X, Y and Z axes are the X and Z axes respectively, and further wherein said means for positioning said locating nubbin in a second and third of said X, Y and Z axes relative to said door assembly comprises an offline door fixture having an up/down locating net pad engaging said peripheral edge of said door, a fore/aft locating block engaging said peripheral edge of said door, a front up/down locator engaging said first appearance feature on said outer panel, a rear up/down locator engaging said second appearance feature on said outer panel, an upper punch, and a lower punch.

11. The apparatus according to claim 10, wherein said offline door fixture establishes a theoretical feature line through said first appearance feature and said second appearance feature, establishes an up/down position of said theoretical feature line relative to said peripheral edge of said door, and establishes an angular position of said theoretical feature line relative to said peripheral edge of said door.

12. The apparatus according to claim 11, wherein said offline door fixture establishes an up/down position of said locating nubbin on said upper and lower hinges in relation to said up/down position of said theoretical feature line, and further wherein said upper and lower punches form said locating nubbin in said up/down position established by said offline door fixture.

13. The apparatus according to claim 11, wherein said offline door fixture establishes an initial fore/aft position of said locating nubbin in relation to said peripheral edge of said door, and further wherein said upper punch forms said locating nubbin on said upper hinge in said initial fore/aft position.

14. The apparatus according to claim 13, wherein said lower punch forms said locating nubbin on said lower hinge relative to said initial fore/aft position of said locating nubbin and said angular position of said theoretical feature line, whereby a final position of said locating nubbin deviates from said initial fore/aft position of said locating nubbin in a manner that compensates for variation in said angular position of said feature line.

15. The apparatus according to claim 14, wherein said final position of said locating nubbin is further adjustable to compensate for door kick up.

16. A method for configuring at least one hinge relative to a door assembly for attachment of said door assembly to a vehicle frame, said method comprising the steps of:
   providing a door assembly defined by X, Y and Z coordinate axes, said door assembly comprising at least one hinge attached to said door assembly, said at least one hinge comprising a first hinge link having means for attachment to said door assembly and a second hinge link pivotally attached to said first hinge link, said second hinge link having a locating nubbin and means for attachment to said vehicle frame;
   setting said at least one hinge in any one of said X, Y and Z coordinate axes relative to said door assembly whereby said door assembly is aligned in said one of said X, Y and Z coordinate axes with said vehicle frame upon attachment thereto; and
   forming said locating nubbin in a second and third of said X, Y and Z coordinate axes relative to said door assembly, whereby said door assembly is aligned in said second and third of said X, Y and Z coordinate axes with said vehicle frame upon attachment thereto.

17. The method according to claim 16, wherein said method further comprises the steps of:
providing said door assembly having a first plurality of appearance features and a second plurality of appearance features, whereby said first and second plurality of appearance features are externally observable features such that alignment thereof is desirable; and providing said door assembly having an upper hinge and a lower hinge.

18. The method according to claim 17, wherein said step of setting said at least one hinge in any one of said X, Y and Z coordinate axes relative to said door assembly comprises the step of providing an offline door fixture having a first locator, and a master plate positioned to establish a net body position in said one of said X, Y and Z coordinate axes for said at least one hinge relative to said first locator.

19. The method according to claim 18, wherein said step of setting said at least one hinge in any one of said X, Y and Z coordinate axes relative to said door assembly comprises the steps of engaging said first locator with said door assembly in said one of said X, Y and Z coordinate axes, and adjusting said at least one hinge in said one of said X, Y and Z coordinate axes to engage said master plate such that said at least one hinge is set in said net body position in said one of said X, Y and Z coordinate axes relative to said door assembly.

20. The method according to claim 17, wherein said step of forming said locating nubbin in a second and third of said X, Y and Z coordinate axes relative to said door assembly comprises the step of providing an offline door fixture to position said locating nubbin in said second of said X, Y and Z coordinate axes relative to one or more of said first plurality of appearance features, and to position said locating nubbin in said third of said X, Y and Z coordinate axes relative to one or more of said second plurality of appearance features.

* * * * *